United States Patent [19]

Sharber et al.

[11] Patent Number: 4,953,822
[45] Date of Patent: Sep. 4, 1990

[54] ADJUSTABLE ARM STRUCTURES

[75] Inventors: Jerry Sharber, Cypress; Frank Kilby, Lawndale, both of Calif.

[73] Assignee: Eldon Industries, Inc., Inglewood, Calif.

[21] Appl. No.: 368,913

[22] Filed: Jun. 19, 1989

Related U.S. Application Data

[63] Continuation of Ser. No. 54,422, May 26, 1987, abandoned.

[51] Int. Cl.$^5$ ................................................ E04G 3/00
[52] U.S. Cl. .................................. 248/281.1; 248/586; 248/278; 248/280.1
[58] Field of Search ............................ 403/98, 61, 116; 248/281.1, 278, 276, 280.1, 277, 278, 585–587

[56] References Cited

U.S. PATENT DOCUMENTS

| 127,798 | 6/1872 | Robb | 248/281.1 |
| 919,777 | 4/1909 | Savin | 248/281.1 |
| 4,402,481 | 9/1983 | Sasaki | 248/276 |
| 4,568,052 | 2/1986 | Solomon et al. | 248/281.1 |

Primary Examiner—Alvin C. Chin-Shue
Attorney, Agent, or Firm—Price, Gess & Ubell

[57] ABSTRACT

An adjustable arm structure capable of being used to support comparatively heavy lamps, books and the like can be constructed so as to use two adjustable arm assemblies. Each of these assemblies uses two parallel links, one of which is attached to a sector plate. The sector plates are clamped together in the structure in a connecting joint at a location remote from where the links are pivotally connected to or in the connecting joint.

4 Claims, 2 Drawing Sheets

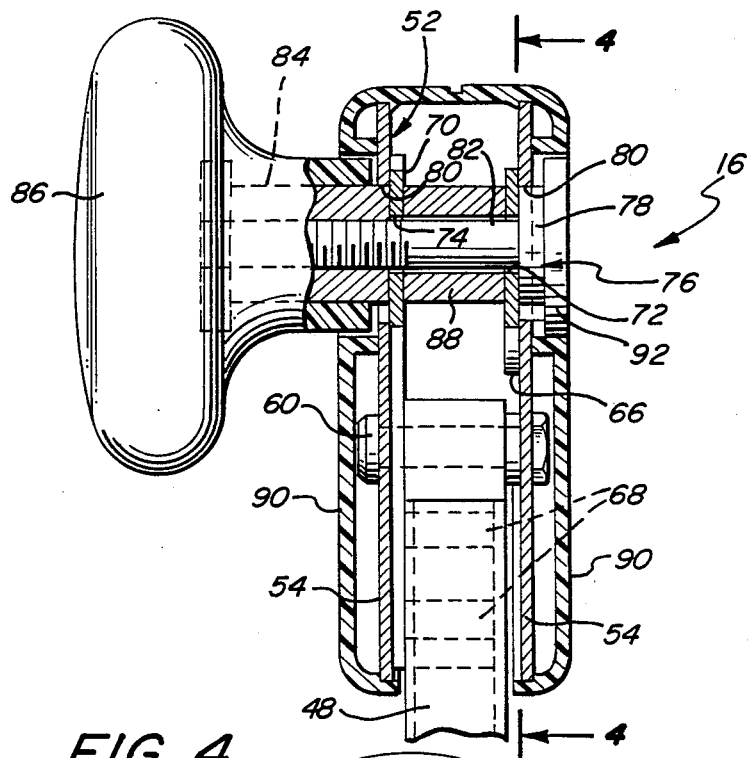
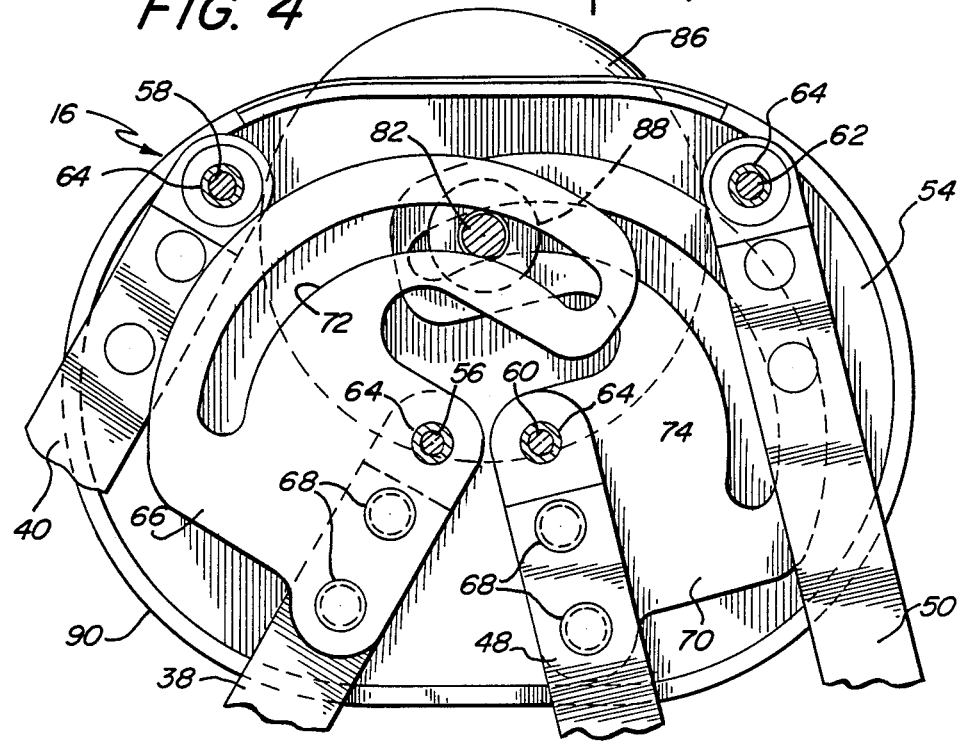

ADJUSTABLE ARM STRUCTURES

This is a continuation of application Ser. No. 054,422 filed on May 26, 1987, now abandoned.

BACKGROUND OF THE INVENTION

The invention set forth in this specification pertains to new and improved adjustable arm structures.

Adjustable arm structures of the type to which this specification pertains are commonly used in offices, drafting rooms and various other related locations to support a lamp of one sort or another in such a manner that the position of the lamp may be easily and conveniently adjusted. They are also commonly used to hold or support document holders such as so called "copy stands" which are often employed to hold a document so that a typist can copy from it. Such arm structures are also on occasion used for a variety of other purposes such as in holding magnifying lens, in holding part trays, in holding various tools and the like.

Although adjustable arm structures used in holding such items have been constructed in a variety of different ways, it is considered that they have normally been constructed so as to each include first and second elongated arm assemblies, a connecting joint for connecting two adjacent ends of the arm assemblies, a mounting joint for use in mounting the entire arm structure on a table, a desk or the like located at the non-connected end of the first arm assembly and a holding joint for holding an item such as a lamp located at the non-connected end of the second arm structure. In such an adjustable arm structure the arm assemblies have usually been constructed so as to each include two parallel links and the ends of these links have been pivotally connected to the various joints indicated.

In such an adjustable arm structure it is conventional to use a spring-normally a coil spring-so that is extends between a link of the first arm assembly and the mounting joint and to use another corresponding spring so that this second spring extends between the connecting joint and a link of the second arm assembly. Such springs will tend to exert forces countering gravity in such a manner that the arm structures are relatively stable in virtually any position to which they can be adjusted. It is also conventional to provide a conventional handle and threaded connections in association with the connecting joint and a link of the second arm assembly to enable the link to be clampled relative to the connecting joint so as to prevent adjustment of the position of the arm assembly.

Adjustable arm structures as indicated in the preceding paragraph are unquestionably highly utilitarian in character. Nevertheless it is believed that there has been a need to improve such structures so that they can be easily and conveniently locked in such a manner that adjustment of the position of the arm assemblies in such structures is effectively precluded. The reason for this need can be readily illustrated with reference to structures as indicated in the preceding. In such structures it is frequently difficult to adequately tighten a handle as noted in order to apply sufficient force to preclude movement when or as a relatively large weight is applied to a holding joint. Such a weight can take the form of a relatively heavy lamp, a heavy book or the like depending upon the use of a specific adjustable arm structure.

BRIEF SUMMARY OF THE INVENTION

A broad objective of the present invention is to provide new and improved adjustable arm structures alleviating the need indicated in the preceding discussion. In meeting this need the invention is intended to provide arm structures as noted with can be easily and conveniently manufactured at a comparatively nominal cost, which may be easily used by even non-mechanically oriented personnel, and which are capable of being intensively employed for prolonged periods with little or no maintenance.

In according with this invention these objectives are achieved by providing an adjustable arm structure which includes first and second elongated arm assemblies located relative to one another so as to have adjacent ends and remote ends, connecting joint means connecting the adjacent ends of said assemblies, a mounting joint means for use in mounting said structure located at the remote end of said first arm, a holding joint means for supporting an item located at the remote end of said second arm, each of said arm assemblies including first and second parallel links, said links of said first arm assembly being pivotally connected to mounting joint means and said connecting joint means, said links of said second arm assembly being pivotally connected to said holding joint means and said connecting joint means, in which the improvement comprises: said connecting joint means including frame means, said links of said arm assemblies being pivotally connected to said frame means, said connecting joint means also including a first sector plate attached to a link of said first arm assembly and a second sector plate attached to a link of said second arm assembly, said sector plates extending parallel to one another, said connecting joint means also including securing means extending between said sector plates for securing said sector plates against movement relative to one another so as to hold said arm assemblies against movement changing the distance between the links in said arm assemblies.

BRIEF DESCRIPTION OF THE DRAWINGS

Because of the nature of the present invention it is best more fully described by referring to the accompanying drawings in which:

FIG. 3 is a partial cross-sectional view taken at line 3—3 of FIG. 2; and

FIG. 4 is a partial cross-sectional view taken at line 4—4 of FIG. 3.

Figure 1:
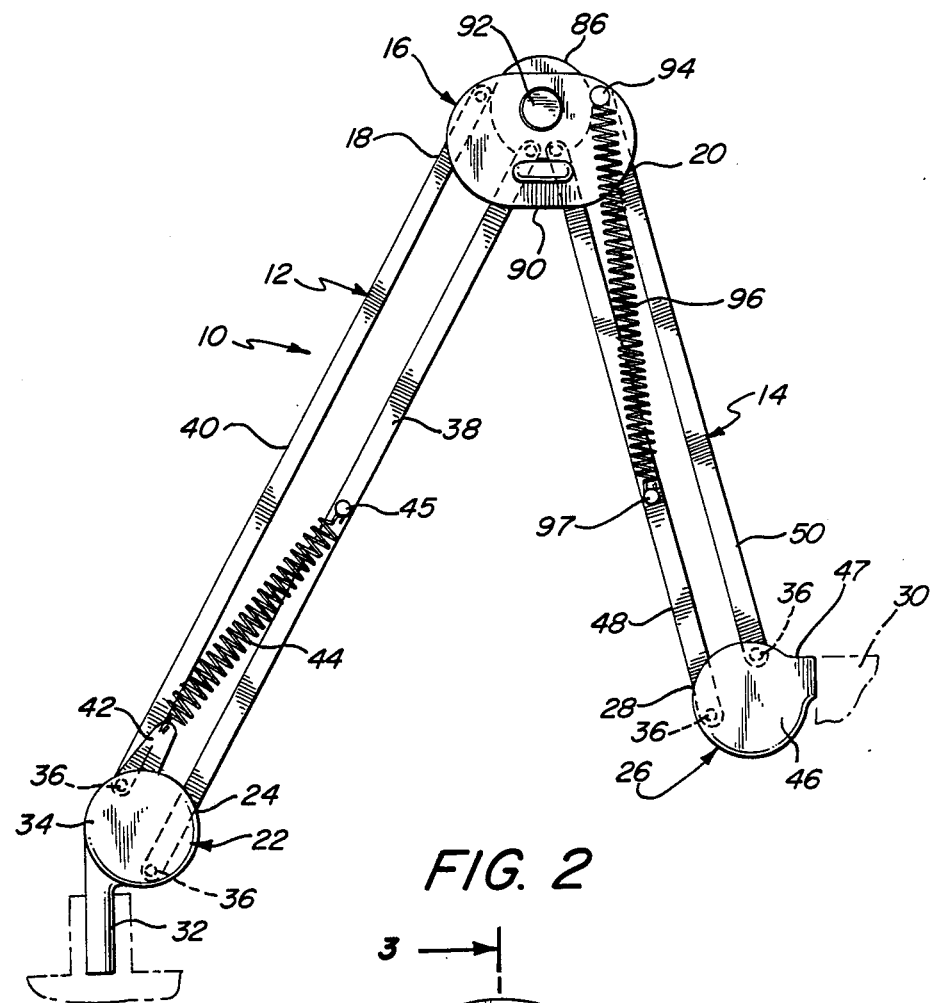
FIG. 1 is side elevational view of a presently preferred embodiment or form of an adjustable arm structure in accordance with the invention.
Figure 2:
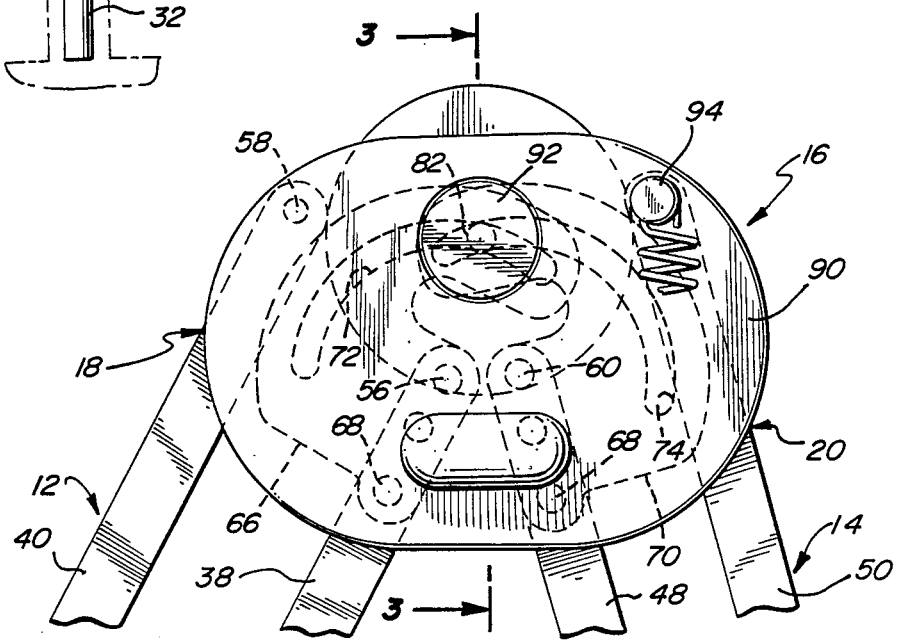
FIG. 2 is a fragmentary view corresponding to a part of FIG. 1 at an enlarged scale.

The precise adjustable arm structure shown in the drawings is constructed so as to utilize the operative concepts or principles of the invention as are sent forth in the accompanying claims. Those skilled in the field of adjustable arm structures of the type to which this invention pertains will realize that these concepts or principles can be applied in other somewhat differently appearing and/or constructed adjustable ar structures through the use or exercise or routine skill in the field of such structures. For this reason the invention is not be considered as being limited to the precise structure illustrated and is to be considered as being limited solely by the appended claims forming a part of this invention.

DETAILD DESCRIPTION OF THE PREFERRED EMBODIMENT

In the drawing there is shown an adjustable arm structure 10 in accordance with this invention. It is considered that it is best described by indicating in a generalized manner the principal parts of assemblies employed in it. This structure 10 is constructed so as to include a first elongated arm assembly 12, a second elongated arm assembly 14, a connecting joint or joint means 16 which is constructed as hereinafter indicated so as to connect the adjacent ends 18 and 20, respectively, of the assemblies 12 and 14, a mounting joint or joint means 22 connected to an end of the first arm assembly 12 and a holding joint or joint means 26 connected to an end of the second arm assembly 14.

The mounting joint means 22 is used to hold the complete structure 10 on a support such as desk or table in a conventional manner. The holding joint means 26 is used to support an item 30 held by the complete structure 10 such as a lamp, a copy holder or any other desired item. It is not considered necessary to describe either the joint 22 or the joint 26 in detail inasmuch as both are constructed in a mechanically conventional manner. The joint 22 includes a conventional pin or shaft 32 capable of being rotatably supported in a conventional holder (not shown). This pin 32 extends from between two parallel plates 34. Only one of these plates 34 is visible in FIG. 1, the other being directly behind it.

Pivot pins 36 extend between these plates 34 for the purpose of pivotally mounting links 38 and 40 of the first arm assembly 12 in a conventional manner. If desired these plates 34, the pins 36 and the adjacent portions of the links 38 and 40 can be considered as constituting the end 24. Normally tabs 42 extending from the plates 34 will be used in a conventional manner to connect coil springs 44 between the joint 22 and a tab 45 on a link of the assembly 12 such as the link 38 as shown. Only one of these tabs 42 and one of the springs 44 is shown in FIG. 1; the others being directly behind them and therefore are not visible. If desired various functional equivalents can, of course, be substituted for the springs 44.

The joint 24 is constructed in a manner which is similar to the manner in which the joint 22 is constructed. It also included parallel plates 46 which carry a small conventional member 48 used to support an item 30 in a known manner. Only one of these plates 46 is visible in FIG. 1, the other being located directly behind the one which is visible. Other pivot pins 36 extend between these plates 46 so as to pivotally support links 48 and 50 of the second arm assembly 14. If desired these plates 46, the pins 36 and the adjacent portions of the links 48 and 50 can be considered as constituting the end 28.

The connecting joint 16 is constructed so as to include what may be referred to as a frame 52. This frame 52 includes two parallel plates 54 held relative to one another through the use of bolts 56, 58, 60 and 62 and through the use of the sleeves 64 serving both as spacers and as pivots. These sleeves 64 are located around the bolts 56, 58, 60 and 62 as shown in FIG. 4 and are "sandwiched" between the plates 54. It will be noted that the bolt 56 is associated with the link 38; that the bolt 58 is associated with the link 40; that the bolt 60 is associated with the link 48; and that bolt 62 is associated with the link 50.

Because of this construction, if desired, all of the bolts 56, 58, 60 and 62 can be referred to as pivots since they pivotally support the various links indicated. With this construction it can be considered that the end 18 of the arm assembly 12 is constituted by the bolts 56 and 58, those portions of the plates 54 connecting them and the adjacent portions (not separately numbered) of the links 38 and 40. Similarly it can be considered that the end 20 of the arm assembly 14 is constituted by bolts 60 and 62, those portions of the plates 54 connecting them and the adjacent portions (not separately numbered) of the links 48 and 50.

The joint 16 also preferably includes a sector plate 66 attached to the link 38 by rivets 68 so as to rotate therewith. Another corresponding sector plate 70 is attached to the link 48 by corresponding rivets 68 so as to also rotate therewith. The plate 66 is provided with an arcuate slot 72 which is centered about the bolt 56; the plate 70 is provided with a corresponding arcuate slot 74 which is centered about the bolt 60. Although these two sector plates 66 and 68 are spaced from one another so as to lie generally alongside of the plates 54 they overlap as shown in FIG. 4 is such a manner that these slots 72 and 74 overlap one another as shown.

This construction enables a bolt 76 to be used in securing the plates 66 and 70 against relative movement. This bolt 76 is constructed so as to include a head 78 positioned within an enlarged opening 80 in one of the plates 54 and a shank 82 threaded into an internally threaded insert 84 within a handle or knob 86. This insert 84 extends through a corresponding opening 80 in the other plate 54 so that it can bear directly against the plate 66 in order to clamp against a sleeve 88. This sleeve 88 is located around the bolt 76 between the two plates 66 and 70.

In order to bind various functional parts of the joint 16 as described in the preceding it is possible to include as a part of this joint 16 two shell like covers 90 which are capable of being snapped or otherwise connected together so as to rest on or be carried by the plates 54. If desired an enlarged secondary head 92 can be located on the bolt 76 for appearance purposes. The covers 90 are not only desirable for appearance reasons. They serve to avoid any possibility of fingers being inserted into the parts described which are located generally between these covers 90.

Tabs 94 on these covers 90 are preferably used to hold other coil springs 96 so that these springs 96 extend between the joint 16 and a tab 97 on the link 48 as shown in what can be regarded as a conventional manner. Only one of these tabs 94 and of the springs 96 are shown; the others are underneath them in FIG. 1 and, hence, are not visible. Of course if desired various functional equivalents can be substituted for the springs 96.

It is considered that the use of the complete adjustable arm structure 10 will be reasonably self evident from the preceding. When the knob 86 is loose it is possible to move and position the arm assemblies 12 and 14 so that they extend at any desired angle relative to one another and to the various joints 16, 22 and 26. During such movement the plates 66 and 70 will move relative to one another because of the construction employed. When they are positioned as desired the entire structure 10 can be "locked up" by tightening the knob 86.

By virtue of the constructional details employed even when the knob 86 is only moderately tightened the entire structure will be capable of supporting relatively heavy items such as the item 30 indicated in the preceding. This is considered to be quite important. It is considered to be primarily related to the use of the overlapping sector plates 66 and 70 cooperating so that single bolt 76 is located so as be capable of clamping them together at a location which is a significant distance from the bolts 56, 58, 60 and 62.

The latter serve as pivots for the various links indicated. If desired a single bolt (not shown) can be used in place of the two bolts 56 and 60 so that both sector plates 66 and 70 used are mounted on a common axis in obtaining the action indicated in this discussion. This is not normally desired because it necessitates a side by side location of parts on a single pivot. Such a structure is considered to be undersirably bulky compared to the described structure in which all links employed are separately mounted into or in the joint 16.

We claim:

1. An improved adjustable arm structure which includes first and second elongated arm assemblies located relative to one another so as to have adjacent ends and remote ends, a connecting joint means connecting the adjacent ends of said elongated arm assemblies, a mounting joint means for use in mounting said structure at the remote end of said first elongated arm assembly, each of said arm assemblies including first and second parallel links, said links of said first arm assembly being pivotally connected to said mounting joint means and said connecting joint means, said links of said second arm assembly being pivotally connected to a holding joint means and said connecting joint means, in which the improvement comprises:

said connecting joint means including a frame means, said links of said arm assemblies being pivotally connected to said frame means at different locations on said frame means;

said connecting joint means also including a first sector plate attached to a link of said first arm assembly and a second sector plate attached to a link of said second arm assembly, said sector plates extending parallel to one another, said sector plates overlying one another, and said sector plates containing arcuate slots which overlap each other in all positions of said sector plates whereby said arm assemblies may be independently moved and positioned relative to said connecting joint means;

said connecting joint means also including a bolt means extending through said arcuate slots of said sector plates for clamping and securing said sector plates within said frame means so as to hold said arm assemblies against movement by preventing any change in the distance between the links in said arm assemblies;

said bolt means being mounted on said frame means so as to be incapable of transverse movement relative to said frame means during the use of said arm structure whereby said bolt means will remain stationary during any movement of said arm assemblies and said arcuate slots said bolt means further including a nut means for use in securing said sector plates by tightening and loosening said bolt means.

2. An adjustable arm structure as claimed in claim 1 wherein:

each of said arucate slots is centered around the pivotal connection between the link on which it is located and said connecting joint.

3. An adjustable arm structure as claimed in claim 2 wherein:

said pivotal connections of said links upon which said sector plates are located to said connecting joint are spaced from one another.

4. An adjustable arm structure as claimed in claim 1 wherein:

each of said arcuate slots is centered around the pivotal connection between the link on which it is located and said connecting joint;

said pivotal connections of said links upon which said sector plates are located being spaced from one another; and said connecting joint means also includes a cover means for covering said sector plates and the pivotal connections between said links and said connecting joint means.

* * * * *